United States Patent [19]

Fujiki et al.

[11] Patent Number: 5,418,065
[45] Date of Patent: May 23, 1995

[54] INTEGRALLY MOLDED ARTICLE OF SILICONE RUBBER AND MODIFIED POLYPROPYLENE RESIN

[75] Inventors: Hironao Fujiki, Takasaki; Shigeki Shudo; Akira Matsuda, both of Annaka; Yasushi Yamamoto, Takasaki; Noboru Shimamoto, Annaka; Eiji Kuchiki, Kawagoe; Yuji Fujita, Tokorozawa, all of Japan

[73] Assignee: Shin-Etsu Chemical Co., Ltd., Tokyo, Japan

[21] Appl. No.: 163,553

[22] Filed: Dec. 9, 1993

[30] Foreign Application Priority Data

Dec. 10, 1992 [JP] Japan ................................ 4-352677
Dec. 10, 1992 [JP] Japan ................................ 4-352678

[51] Int. Cl.$^6$ ........................ B32B 7/04; B32B 25/20; B32B 27/32
[52] U.S. Cl. ........................................ 428/451; 428/447
[58] Field of Search ............................... 428/447, 451

[56] References Cited

U.S. PATENT DOCUMENTS 4,257,936  3/1981  Matsumoto et al. ........... 260/37 SB
4,814,231  3/1989  Onohara et al. ................. 428/425.5

FOREIGN PATENT DOCUMENTS

143994   6/1985  European Pat. Off. .
249336  12/1987  European Pat. Off. .

*Primary Examiner*—D. S. Nakarani
*Attorney, Agent, or Firm*—Birch, Stewart, Kolasch & Birch

[57] ABSTRACT

In a polypropylene resin/silicone rubber integrally molded article, a polypropylene resin having an aliphatic unsaturated bond is integrally joined to an addition type silicone rubber at high bond strength. It is prepared by injection molding a modified polypropylene resin into a preform, injection molding a silicone rubber composition over the preform, and curing the composition at a temperature below the softening point of the polypropylene resin. Stronger bond is established when the silicone rubber contains a tackifier in the form of a compound containing in a molecule at least one hydrogen atom directly attached to a silicon atom and an alkoxysilyl, glycidyl or acid anhydride group or a —$(CH_2)_n$— linkage.

14 Claims, 4 Drawing Sheets

INTEGRALLY MOLDED ARTICLE OF SILICONE RUBBER AND MODIFIED POLYPROPYLENE RESIN

BACKGROUND OF THE INVENTION

1. Field of the Invention

This invention relates to an integrally molded article of polypropylene resin and silicone rubber which is useful in the areas of electric equipment, electronic equipment, automobiles, precision machines and the like and a method for preparing the same.

2. Prior Art

A number of methods have been proposed for providing a bond between addition curing type silicone rubber and organic resins. It is known, for example, to form a bond by applying a primer to a surface of molded resin, applying uncured silicone rubber material thereto and curing the silicone rubber to the resin or by curing self-adhesive silicone rubber compositions directly to molded resin. For the self-adhesive silicone rubber compositions, a number of proposals have been made on their tackifier component.

As another approach, it is known from Japanese Patent Publication (JP-B) No. 34311/1990 to add an organohydrogenpolysiloxane containing at least 30 mol % of hydrogen atoms directly attached to silicon atoms to an organic resin so that the resin is bondable with addition curing type silicone rubber. JP-B 45292/1988 discloses integration by physically fitting silicone rubber within molded organic resin. In Japanese Patent Application Kokai (JP-A) No. 193843/1988, a compound having an aliphatic unsaturated group and a hydrolyzable group attached to a silicon atom is grafted to an olefin resin and silicone rubber is bonded and integrated with the grafted olefin resin. Furthermore, as we previously proposed, a thermoplastic resin can be bonded and integrated to a silicone rubber composition when a compound having an unsaturated group and a hydrogen atom directly attached to a silicon atom is added to the resin (U.S. Ser. No 07/965,303 and EP 0540259 A1).

However, several problems arise with these prior art methods for integrating silicone rubber and organic resin into a one-piece article. The primer method is cumbersome in that a once molded resin shape must be taken out of the mold before the primer can be applied thereto.

Where a self-adhesive addition curing type silicone rubber material is applied and cured to a resin preform, the resulting bond strength is insufficient for use as a one-piece member if the resin is a polypropylene resin.

Where organohydrogenpolysiloxane is added to olefin resin, the properties of the resin itself can be altered thereby, preventing the resin from exerting its own properties. The physical engagement method leaves a possibility that the two segments be disengaged by physical forces. The use of an olefin resin having grafted thereto a compound having an aliphatic unsaturated group and a hydrolyzable group attached to a silicon atom cannot dispense with a primer when it should be joined to addition curing type silicone rubber.

In these years, silicone rubber has found a spreading use in the fields of electric and electronic equipment and automobiles because it is recognized highly reliable in the aspects of heat resistance, weatherability and electrical properties. To meet such a demand, there is a desire to have integral moldings in which thermosetting resin, especially polypropylene resin and silicone rubber are firmly united or bonded together.

SUMMARY OF THE INVENTION

Therefore, an object of the present invention is to provide a polypropylene resin/silicone rubber integrally molded article wherein the polypropylene resin and the silicone rubber are joined at a practically acceptable bond strength. Another object is to provide a method for preparing such a polypropylene resin/silicone rubber integrally molded article in a simple reliable manner within a short time, typically by an injection molding technique.

Although the prior art techniques failed to bond a silicone rubber composition to a polypropylene resin within a short time practically because the silicone rubber composition had a low bonding force, we have found that an integrally molded article in which silicone rubber and polypropylene resin are joined at a practically acceptable bond strength can be produced in a simple manner by using a modified polypropylene resin having an aliphatic unsaturated group as the polypropylene resin and using an addition curing type silicone rubber as the silicone rubber to be integrally joined to the polypropylene resin. Stronger bond is established when the silicone rubber composition contains a tackifier component selected from (I) a compound containing in a molecule at least one hydrogen atom directly attached to a silicon atom and at least one member selected from the group consisting of an alkoxysilyl group, glycidyl group and acid anhydride group and (II) a compound containing in a molecule at least one hydrogen atom directly attached to a silicon atom and a divalent linkage —$(CR^1R^2)_n$— wherein each of $R^1$ and $R^2$ is a hydrogen atom or a substituted or unsubstituted monovalent hydrocarbon group having 1 to 10 carbon atoms and letter n is an integer of from 2 to 30. Particularly when the silicone rubber composition contains compound (II), it can be molded over the polypropylene resin by an injection molding technique and cured thereto within a short time to provide a firm bond. At the same time, the silicone rubber itself is releasable from the mold in a practically acceptable manner. Such an integrally molded article of polypropylene resin/silicone rubber has never been available in the art.

According to a first aspect of the present invention, there is provided an integrally molded article in which a polypropylene resin having an aliphatic unsaturated bond or a composition containing the same is integrally joined to an addition type silicone rubber. In one preferred embodiment, the silicone rubber contains the following component (I) or (II). Component (I) is a compound containing in a molecule at least one hydrogen atom directly attached to a silicon atom and at least one member selected from the group consisting of an alkoxysilyl group, glycidyl group and acid anhydride group. Component (II) is a compound containing in a molecule at least one hydrogen atom directly attached to a silicon atom and a divalent linkage —$(CR^1R^2)_n$— wherein each $R^1$ and $R^2$ is a hydrogen atom or a substituted or unsubstituted monovalent hydrocarbon group having 1 to 10 carbon atoms and letter n is an integer of from 2 to 30.

According to a second aspect of the present invention, there is provided a method for preparing a polypropylene resin/silicone rubber integrally molded article, comprising the steps of:

molding a polypropylene resin having an aliphatic unsaturated bond or a composition containing the same into a preform, contacting an adhesive silicone rubber composition with a surface of the preform, the silicone rubber composition containing (a) an alkenyl group-containing organopolysiloxane, (b) an organohydrogenpolysiloxane having at least two hydrogen atoms each directly attached to a silicon atom in a molecule, and (c) an addition reaction catalyst, curing the silicone rubber composition at a temperature lower than the softening point of said polypropylene resin or composition containing the same.

In one preferred embodiment, the silicone rubber composition further contains (d) component (I) or (II) defined above. In a further preferred embodiment, both the molding and contacting steps are performed by injection molding.

DETAILED DESCRIPTION OF THE INVENTION

Polypropylene

A polypropylene resin having an aliphatic unsaturated group is used herein. The term polypropylene resin encompasses resins including a propylene unit. More particularly, the polypropylene resins which can be used herein are classified into three classes (1), (2) and (3) as described below. A composition containing such a polypropylene resin is described as class (4). However random copolymers of propylene with a diene having the structure $CH=C(CH_3)_2$ should be excluded from the use in the present invention because they are less adhesive.

Class (1) includes random copolymers of propylene with a non-conjugated diene compound of the following general formula.

In the formula, $R_1$ to $R_4$ are independently a hydrogen atom or alkyl group, preferably having 1 to 6 carbon atoms. The diene compound does not have the structure $CH=C(CH_3)_2$, that is, it is excluded that both $R_1$ and $R_2$ are methyl groups and $R_3$ is a hydrogen atom at the same time. Letter n is an integer of 1 to 20.

Exemplary of the non-conjugated diene are 2-methyl-1,4-pentadiene, 1,4-hexadiene, 4-methyl-1,4-hexadiene, 1,4-heptadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene, and 1,13-tetradecadiene. Also useful are cyclic non-conjugated dienes such as vinylcyclohexene, vinylnorbornene, dicyclopentadiene, and ethylidenenorbornene, and trienes such as 1,3,7-octatriene and 1,5,9-decatriene. Preferred among these are 1,9-decadiene and 1,13-tetradecadiene. These non-conjugated diene compounds may be used alone or in admixture of two or more.

Random copolymerization of propylene with non-conjugated diene compound may be effected by conventional copolymerization methods using Ziegler-Natta catalysts. Preferably the non-conjugated diene is used in an amount of about 0.01 to 20 mol %, more preferably about 0.05 to 15 mol %, most preferably about 0.1 to 10 mol % of the copolymer. No strong bonding force would be exerted between copolymers with a non-conjugated diene content of less than 0.01 mol % and the silicone rubber. Copolymers with a non-conjugated diene content of more than 20 mol % would suffer from a substantial loss of crystallinity.

Another unsaturated compound such as ethylene and butene-1 may be copolymerized with the random copolymers.

The copolymers generally have a melt flow rate (MFR) of 0.01 to 1,000 g/10 min. at a temperature of 230° C. under a load of 2.16 kg. It is also acceptable to blend the random copolymer with a different type of polyolefin.

Class (2) includes graft copolymers in which polypropylene is graft polymerized with a diene compound of the following general formula.

In the formula, $R_1$ to $R_4$ are independently a hydrogen atom or alkyl group, preferably having 1 to 6 carbon atoms and letter m is an integer of 1 to 20.

Exemplary of the diene are 2-methyl-1,4-pentadiene, 1,4-hexadiene, 4-methyl-1,4-hexadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene, and 1,13-tetradecadiene. Also useful are cyclic non-conjugated dienes such as vinylcyclohexene, vinylnorbornene, dicyclopentadiene, and ethylidene-norbornene, and trienes such as 1,3,7-octatriene and 1,5,9-decatriene. Preferred among these are 1,9-decadiene and 1,13-tetradecadiene. These non-conjugated diene compounds may be used alone or in admixture of two or more.

A diene is grafted to polypropylene by radical polymerization using any desired method, for example, a solution method of dissolving polypropylene in an organic solvent such as xylene and toluene and adding a diene and a radical generating agent to the solution for reaction to take place, and a melt milling method of melting and milling a mixture of polypropylene, diene and radical generating agent in an extruder for reaction to take place. Preferably the diene is used in an amount of about 0.01 to 20 mol % of the resulting copolymer.

Preferred examples of the radical generating agent or reaction initiator include peroxides such as benzoyl peroxide, lauroyl peroxide, di-tert-butyl peroxide, acetyl peroxide, tert-butyl peroxypivalate, 2,5-dimethyl-2,5-di-tert-butyl peroxyhexine, and tert-butyl peroxyperbenzoate, and diazo compounds such as azobisisobutyronitrile. The radical generating agent is desirably used in an amount of about 1 to 50 parts by weight per 100 parts by weight of the monomer having an unsaturated bond. The graft copolymer generally has an MFR of 0.01 to 1,000 g/10 min. It is also acceptable to blend the graft copolymer with a different type of polyolefin.

Class (3) includes modified polypropylenes which are obtained by introducing an unsaturated bond into polypropylene at two stages: the first stage of block copolymerizing a first monomer having both an unsaturated bond and a first functional group with propylene or grafting such a monomer to polypropylene through radical polymerization and a second stage of reacting the block copolymer or graft polymer with a second compound having both an unsaturated bond and a second functional group capable of reacting with the first functional group.

The monomers used in the first stage include unsaturated amides and amines such as acrylamide, methacrylamide, and allylamine; unsaturated epoxy compounds such as glycidyl methacrylate, glycidyl acrylate, glycidyl allyl ether, and N-[4-(2,3-epoxypropoxy)-3,5-dimethylbenzyl]acrylamide; unsaturated carboxylic acids such as maleic anhydride, 5-Norbornene-2,5-dicarboxylic anhydride, and acrylic acid; vinyl oxazolines; and unsaturated compounds having a hydroxyl group such as allyl alcohols. For block copolymerizing such a monomer having an unsaturated bond with propylene, a living polymerization technique may be employed as disclosed in JP-A 252614/1985. The proportion of the monomer introduced into the polypropylene copolymer is preferably 0.01 to 20 mol %. It is noted that another unsaturated compound such as ethylene and butene-1 may be further copolymerized in this copolymer. Desirably the copolymer has an MFR of 0.01 to 1,000 g/10 min.

In an alternative version of the first stage, a monomer having an unsaturated bond is grafted to propylene by radical polymerization using any desired method, for example, a solution method of dissolving polypropylene in an organic solvent such as xylene and toluene and adding the monomer and a radical generating agent to the solution for reaction to take place, and a melt milling method of melting and milling a mixture of polypropylene, monomer and radical generating agent in an extruder for reaction to take place. Preferably the monomer is used in an amount of about 0.01 to 20 mol % of the resulting copolymer.

Preferred examples of the radical generating agent or reaction initiator include peroxides such as benzoyl peroxide, lauroyl peroxide, di-tert-butyl peroxide, acetyl peroxide, tert-butyl peroxyperbenzoate, dicumyl peroxide, peroxybenzoic acid, peroxyacetic acid, tert-butyl peroxypivalate, 2,5-dimethyl-2,5-di-tert-butyl peroxyhexine, and tert-butyl peroxyperbenzoate and diazo compounds such as azobisisobutyronitrile. The radical generating agent is desirably used in an amount of about 1 to 50 parts by weight per 100 parts by weight of the monomer having an unsaturated bond. The graft copolymer generally has an MFR of 0.01 to 1,000 g/10 min.

The second stage uses the second compound having an unsaturated bond and a second functional group which is selected from the same exemplary monomers as the first monomer, but different from the first monomer.

In the second stage, the second compound having an unsaturated bond is reacted with the block or graft polymer (polypropylene) by any desired method, for example, a solution method of dissolving the polymer in an organic solvent such as xylene and toluene and adding the second compound to the solution for reaction to take place, and a melt milling method of melting and milling a mixture of the polymer and second compound in an extruder for reaction to take place.

The modified polypropylene having an unsaturated bong introduced therein generally has an MFR of 0.01 to 1,000 g/10 min. It is also acceptable to blend the modified polypropylene with a different type of polyolefin.

Class (4) includes resin compositions obtained by blending conventional polypropylene with one or more of the following components (i) to (iii).

(i) The modified polypropylenes of Classes (1) to (3) inclusive of oligomers.
(ii) Polymers and oligomers having an unsaturated bond in a molecule. Examples are ethylene-propylene-diene rubbers using ethylidene-norbornene, dichloropentadiene and 1,4-hexadiene, butadiene copolymers, 1,2-polybutadiene, and double bond-terminated polyolefins.
(iii) Silica and glass fiber surface treated with silane coupling agents having an unsaturated bond in a molecule. Examples of the silane coupling agent having an unsaturated bond include vinyltrimethoxysilane, vinyltriethoxysilane, vinyltris(2-methoxyethoxy)silane, and 3-methacryloxypropyltrimethoxysilane.

Silicone Rubber

The silicone rubber to be integrally joined with the above-defined polypropylene resin or a composition containing the same is an addition cured silicone rubber. Preferably the silicone rubber is obtained by curing a silicone rubber composition comprising (a) an alkenyl group-containing organopolysiloxane, (b) an organohydrogenpolysiloxane having at least two hydrogen atoms each directly attached to a silicon atom in a molecule, and (c) an addition reaction catalyst.

Component (a) is an organopolysiloxane containing an alkenyl group which may be selected from well-known organopolysiloxanes conventionally used as a major component of addition curing type silicone rubber compositions, typically having a viscosity of about 100 to 100,000 centipoise at room temperature.

Preferred organopolysiloxanes are represented by the general formula: $R_aSiO_{(4-a)/2}$ wherein R is a substituted or unsubstituted monovalent hydrocarbon group, preferably having 1 to 8 carbon atoms. Examples of the hydrocarbon group represented by R include alkyl groups such as methyl, ethyl and propyl; alkenyl groups such as vinyl, propenyl and butenyl; aryl groups such as phenyl and xylyl; and halo- or cyano-substituted hydrocarbon groups such as 3,3,3-trifluoropropyl. The monovalent hydrocarbon groups may be identical or different as long as an alkenyl group is contained in the organopolysiloxane molecule. The content of alkenyl group is preferably 0.01 to 10 mol %, especially 0.1 to 1 mol % of the entire R groups. Letter a is a number of 1.9 to 2.4. The organopolysiloxane may be a linear one or a branched one further containing a $RSiO_{3/2}$ unit or $SiO_{4/2}$ unit. The substituent on the silicon atom is basically any of the above-mentioned groups. It is desirable to introduce a vinyl group among the alkenyl groups and a methyl or phenyl group among other substitutent groups.

Illustrative, non-limiting examples of the organopolysiloxane are given below.

In these formulae, R is as defined above (excluding an aliphatic unsaturated group), and letters m and n are positive numbers meeting $m+n=100$ to 5000 and $m/(m+n)=0.001$ to 0.1.

The organopolysiloxanes may be prepared by per se known methods. For example, they are obtained by effecting equilibration reaction between an organocyclopolysiloxane and a hexaorganodisiloxane in the presence of an alkali or acid catalyst.

Component (b) is an organohydrogenpolysiloxane which serves as a crosslinking agent by reacting with component (a). It is not particularly limited in molecular structure and may be any of conventionally used organohydrogenpolysiloxanes of linear, cyclic and branched structures. However, it should have at least two hydrogen atoms each directly attached to a silicon atom in a molecule. The substituent or substituents attached to a silicon atom other than hydrogen are the same as the substituents described for organopolysiloxane (a).

Component (b) is preferably added in an amount to provide 0.4 to 5 equivalents, especially 0.8 to 2 equivalents per alkenyl group in component (a). Less than 0.4 equivalents of component (b) on this basis would result in cured silicone rubber having a too low crosslinking density and hence, less heat resistance. More than 5 equivalents of component (b) would give rise to a bubbling problem due to dehydrogenation reaction, also adversely affecting heat resistance.

The organohydrogenpolysiloxanes may be prepared by per se known methods. For example, the most commonly used method is by equilibrating octamethylcyclotetrasiloxane and/or tetramethylcyclotetrasiloxane and a compound containing a hexamethyldisiloxane or 1,1-dihydro-2,2,3,3-tetramethyldisiloxane unit which will become a terminal group in the presence of a catalyst such as sulfuric acid, trifluoromethanesulfonic acid, and methanesulfonic acid at a temperature between $-10°$ C. and $+40°$ C.

Component (c) is an addition reaction catalyst which is generally selected from platinum and platinum compounds. Since the catalyst is used for promoting curing addition reaction or hydrosilation between components (a) and (b), it may be a conventional known one. Exemplary are platinum black, chloroplatinic acid, alcohol modified chloroplatinic acid, complexes of chloroplatinic acid with olefins, aldehydes, vinylsiloxanes or acetylene alcohols. Rhodium complexes are also useful. The amount of the catalyst added is suitably determined in accordance with a desired curing rate although it is generally in the range of 0.1 to 1000 ppm, preferably 1 to 200 ppm of platinum or rhodium based on the total of the entire components.

It is recommended that the silicone rubber composition further contains (d) a component in the form of a compound (I) or (II).

(I) is a compound containing in a molecule at least one hydrogen atom directly attached to a silicon atom and at least one member selected from the group consisting of an alkoxysilyl group, glycidyl group and acid anhydride group.

(II) is a compound containing in a molecule at least one hydrogen atom directly attached to a silicon atom and a divalent linkage $—(CR^1R^2)_n—$ wherein each of $R^1$ and $R^2$ is a hydrogen atom or a substituted or unsubstituted monovalent hydrocarbon group having 1 to 10 carbon atoms and letter n is an integer of from 2 to 30.

The minimum requirement for component (d) is that it contains at least one hydrogen atom directly attached to a silicon atom in a molecule and it improves affinity to an organic resin (polypropylene resin having an aliphatic unsaturated bond) to which the silicone rubber is to be joined. From the standpoint of joining silicone rubber to organic resin, it is more preferred that the compound contains more than one hydrogen atom directly attached to a silicon atom in a molecule.

To this end, many of conventional tackifier components proposed in the prior art are satisfactory. The use of these tackifier components can not provide silicone rubber with sufficient adherence to conventional polypropylene resins, but to the specific polypropylene resin having an unsaturated group capable of hydrosilylation as contemplated herein. That is, although none of the prior art techniques can firmly join silicone rubber to polypropylene resins at a practical bond strength, the present invention selects a modified polypropylene resin and then permits silicone rubber, coupled with a tackifier component, to form a practically acceptable bond to the polypropylene resin.

Examples of compound (I) are given below.

Any of the foregoing compounds may be used as tackifier component (d) to accomplish a sufficient bonding force between silicone rubber and polypropylene resin. The use of these compounds, however, has the problem that when it is desired to mold silicone rubber to a certain shape using a metallic molding jig, typically a metallic mold, the silicone rubber will stick to the jig. One solution to this problem is to use a molding jig having a surface made of a less adhesive material, for example, by applying a Teflon ® resin coating to the jig surface. This solution is effective in some applications, but less reliable from the aspect of service life in other cases and unacceptable where the dimensional precision of a molded article on its surface is of importance.

Useful in such cases is a second class of compounds free of a tackifying functional group such as trialkoxysilyl, glycidyl and acid anhydride groups. It is to be noted that the first class of compounds (I) having a tackifying functional group as mentioned above can be used without the problem insofar as the functional group is fully suppressed in reactivity by the steric restraint or electronic action of a substituent group or neighbor group.

The second class consists of compounds (II), examples of which are given below.

n = 2 to 30

The amount of component (d) blended is properly determined without undue experimentation although it is preferably about 0.05 to 10 parts by weight per 100 parts by weight of component (a).

In one preferred embodiment where the silicone rubber should have physical strength, the silicone rubber composition further includes component (e) in the form of finely divided silica in an amount of 0 to 100 parts, preferably 5 to 50 parts, more preferably 10 to 40 parts by weight per 100 parts by weight of the total of components (a) and (b). Useful silica has a specific surface area of at least 50 m²/g. Exemplary of hydrophilic silica are Aerosil 130, 200 and 300 (commercially available from Nippon Aerosil K.K. and Degussa), Cabosil MS-5 and MS-7 (Cabot Corp.), Rheorosil QS-102 and 103 (Tokuyama Soda K.K.), and Nipsil LP (Nippon Silica K.K.). Exemplary of hydrophobic silica are Aerosil R-812, R-812S, R-972 and R-974 (Degussa), Rheorosil MT-10 (Tokuyama Soda K.K.), and Nipsil SS series (Nippon Silica K.K.).

In some cases, the curing time of the silicone rubber composition must be controlled in order that it be effective in practice. Then a suitable control agent is used. It may be selected from vinyl-containing organopolysiloxanes such as vinylcyclotetrasiloxane, triallylisocyanurate, alkyl maleates, acetylene alcohols and silane or siloxane modified derivatives thereof, hydroperoxides, tetramethylethylenediamine, benzotriazole and mixtures thereof.

Moreover, suitable additives may be blended in the silicone rubber composition. Such additives include non-reinforcing fillers such as ground quartz, diatomaceous earth, and calcium carbonate, coloring agents including inorganic pigments such as Cobalt Blue and organic dyes, and agents for improving heat resistance and flame retardance such as cerium oxide, zinc carbonate, manganese carbonate, iron oxide, titanium oxide, and carbon black.

The addition curing type silicone rubber composition is comprised of the essential and optional components mentioned above. The silicone rubber composition in uncured state is integrally molded over the polypropylene resin by any desired technique, for example, by placing the uncured silicone rubber composition in a desired form on a preform of the polypropylene resin ad heating the assembly at a temperature below the softening temperature of the polypropylene resin. Placement of the uncured silicone rubber composition in a desired form can be done by molding, coating or dipping. Another technique is by placing the uncured silicone rubber composition on a preform of the polypropylene resin and heating and compressing the assembly at a temperature below the softening temperature of the polypropylene resin. Alternatively, using an injection molding machine, the polypropylene resin is first injection molded in a mold and the silicone rubber composition is then heated and injected into the same mold.

In molding the unsaturated group-bearing polypropylene resin into a preform, any of molding techniques commonly used for conventional thermoplastic resins may be employed. One exemplary known convenient technique includes pelletizing the polypropylene resin, introducing the pellets into a mold heated above the softening point of the polypropylene resin, and cooling the mold to below the softening point of the polypropylene resin. This technique generally uses a machine known as an injection molding machine or transfer molding machine. Thereafter, the silicone rubber composition is molded over the polypropylene resin preform. At this point, the silicone rubber composition may be liquid, putty or paste in uncured state. Desired for ease of molding is a liquid or paste one known as a liquid silicone rubber composition to those skilled in the art.

There has been described a polypropylene resin/silicone rubber integrally molded article in which a polypropylene resin having an aliphatic unsaturated group or a composition containing the same is used, and an addition type silicone rubber is overlaid, joined and integrated to the polypropylene resin so that a strong bond is established between the polypropylene resin and the silicone rubber. This molded article finds application as parts in electric, electronic, automotive and precision equipment fields since it takes advantages of the properties of both polypropylene resin and silicone rubber.

According to the method of the invention, such a polypropylene resin/silicone rubber integrally molded article can be prepared in a simple reproducible manner. Molding of the polypropylene resin or its composition and placement of the silicone rubber in contact with the polypropylene resin preform can be accomplished by injection molding. Particularly when a compound (II) is used as tackifier component (d) in the silicone rubber composition, the silicone rubber as molded and cured can be smoothly removed from the mold without sticking. Easy release of the silicone rubber from the metallic mold is one of the benefits of the invention.

EXAMPLE

Examples of the present invention are given below by way of illustration and not by way of limitation. All parts are by weight.

Example 1

Preparation of Silicone Rubber Composition

A kneader was charged with 100 parts of a dimethylsiloxane polymer blocked with a dimethylvinylsilyl group at either end and having a viscosity of 10,000 centipoise at 25° C., 40 parts of fumed silica having a specific surface area of 300 cm²/g, 8 parts of hexamethyldisilazane, and 1 part of water. The contents were agitated and mixed at room temperature for one hour, heated to 150° C., and mixed for a further 2 hours at the temperature. Thereafter, the mixture was cooled down to room temperature. To the mixture were added 20 parts of the dimethylsiloxane polymer blocked with a dimethylvinylsilyl group at either end and having a viscosity of 10,000 centipoise at 25° C., 3 parts of a methylhydrogenpolysiloxane represented by formula (A) below and having a viscosity of about 10 centipoise at 25° C., 4 parts of a vinylmethylpolysiloxane containing 5 mol % of a vinyl group directly attached to a silicon atom and having a viscosity of 1,000 centipoise at 25° C., 0.1 part of acetylene alcohol for extending the curing time at room temperature, and 50 ppm calculated as platinum atom of a platinum vinylsiloxane complex. The mixture was fully mixed until uniform, obtaining a liquid addition type silicone rubber composition (I).

(A)

Composition (I) was pressed into a sheet at 120° C. for 10 minutes. Upon measurement of mechanical properties, the sheet had a hardness of 40 on JIS A scale, an elongation of 500%, at tensile strength of 100 kgf/cm², and a tear strength of 35 kgf/cm.

Preparation of Polypropylene Resin

Random copolymerization of propylene and 1,9-decadiene was effected at 70° C. in the presence of a propylene polymerizing catalyst based on a Ziegler-Natta catalyst activating titanium trichloride. The modified polypropylene resin had a 1,9-decadiene content of 2.5 mol % as measured by NMR and an MFR of 0.1 g/10 min.

The modified polypropylene resin was admitted into a thermoplastic resin injection molding machine where the resin was plasticized at 200° C. and injected into a plurality of sheet-shaped mold cavities whereby a plurality of sheets of 25 mm wide, 100 mm long, and 2 mm thick were molded. The injection molding conditions included an injection time of 6 seconds, a cooling time of 30 seconds, an injection pressure of 1,000 kg/cm$^2$, a clamping pressure of 35 ton, and a cavity temperature of 60° C.

Figure 1A:
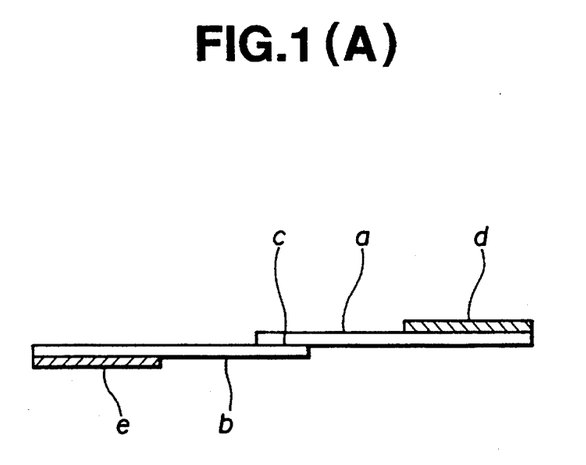
FIGS. 1A and 1B are side and plan views of an adhesion test piece.
Figure 1B:
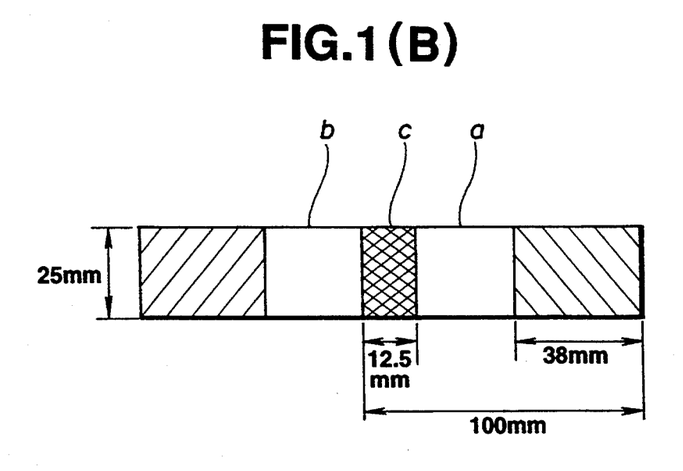

To a jig for forming shear adhesion test pieces was fixedly attached the polypropylene resin sheet. A proper amount of the silicone composition (I) was poured into the jig where it was cured by heating for 8 minutes in a 120° C. constant temperature oven, obtaining a test piece as shown in the side and plan views of FIGS. 1A and 1B. In FIG. 1, a polypropylene resin sheet 12 is joined to a cured part of the silicone composition 14 (25×100×2 mm) through a bond zone 16. Supports 18 and 20 support the resin sheet 12 and the cured silicone part 14, respectively.

The test piece was examined by an adhesion test. The results are shown in Table 1.

Comparative Example 1

An adhesive test piece as shown in FIGS. 1A and 1B was prepared by the same procedure as in Example 1 except that the modified polypropylene resin was replaced by a commercially available (unmodified) polypropylene. The test pieces were examined for adhesion. The results are also shown in Table 1.

TABLE 1

|  | Polypropylene | Test |
|---|---|---|
| Example 1 | modified | bonded |
| Comparative Example 1 | unmodified | separated |

Example 2

Figure 2:
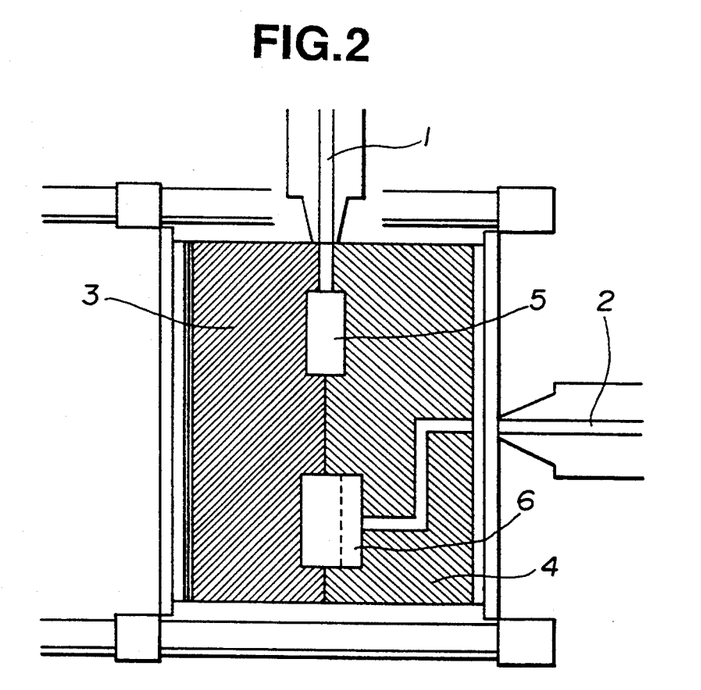
FIG. 2 is a schematic cross-sectional view of an injection molding machine used in preparing a molded article according to the present invention.

A two color injection molding machine including a pair of injectors was used herein. Referring to FIG. 2, the injectors include nozzles 1 and 2. A mold includes left and right mold halves 3 and 4 which are formed with opposed upper and lower recesses so that they define upper and lower cavities 5 and 6 when mated along a parting line. The nozzle 1 extends through the mold along the parting line for fluid communication with the upper mold cavity 5. The nozzle 2 extends through the right mold half 4 at the center of its right side surface for fluid communication with the lower mold cavity 6.

Figure 3:
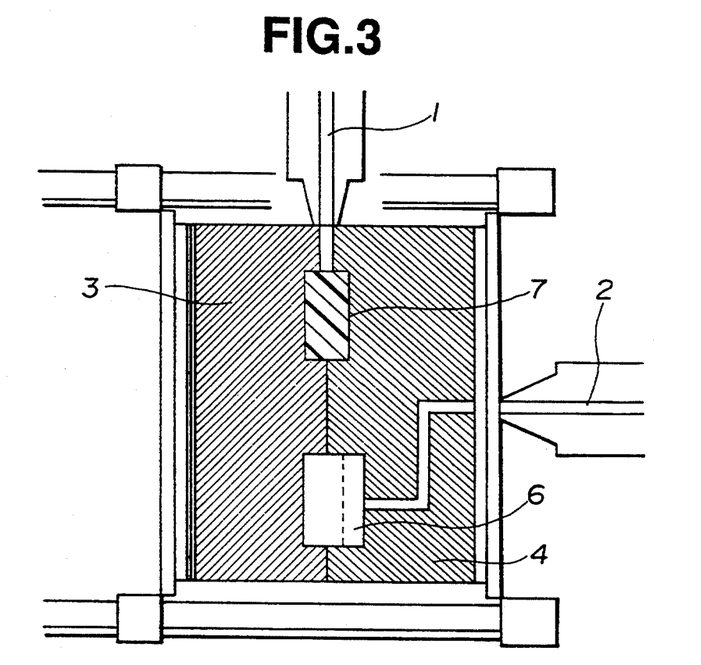
FIG. 3 is a schematic cross-sectional view similar to FIG. 2 at a stage when a polypropylene resin is injection molded.

The same polypropylene resin modified with 2.5 mol % of diene as in Example 1 was admitted into the injection molding machine where it was melted at 200° C. and injected into the upper cavity 5 through the nozzle 1 to mold a polypropylene resin sheet 7 as shown in FIG. 3. The injection molding conditions included an injection time of 6 seconds and a cooling time of 35 seconds while the upper cavity 5 and left mold half 3 were maintained at a temperature of 60° C.

Figure 4:
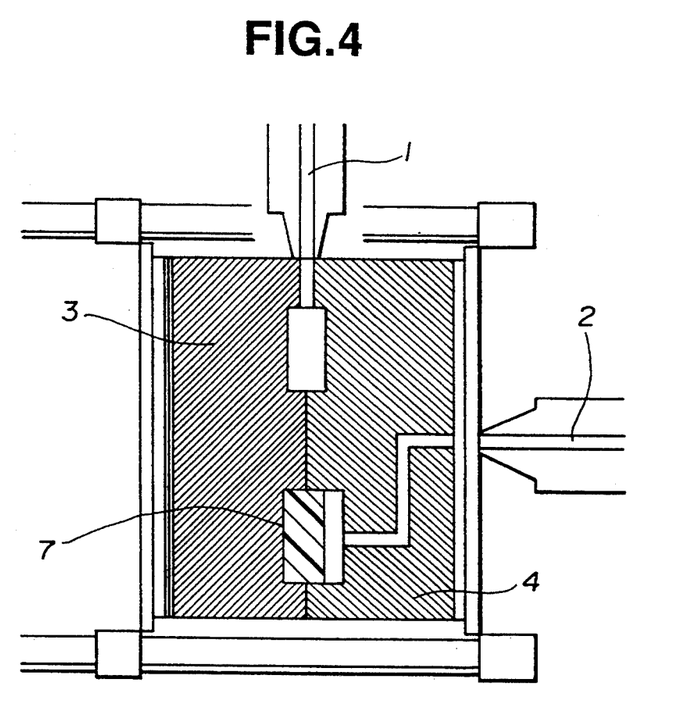
FIG. 4 is a schematic cross-sectional view similar to FIG. 2 at a stage when a left mold half is reversed.

Next, the right mold half 4 was removed to open the mold. With the resin sheet 7 left in the recess of the left mold half 3, the mold half 3 was rotated 180° about a horizontal axis. The mold half 4 was mated again with the left mold half 3 and clamped together. Then a cavity for molding a silicone rubber sheet was defined between the exposed surface of the resin sheet 7 and the lower recess of the right mold half 4 as shown in FIG. 4.

Figure 5:
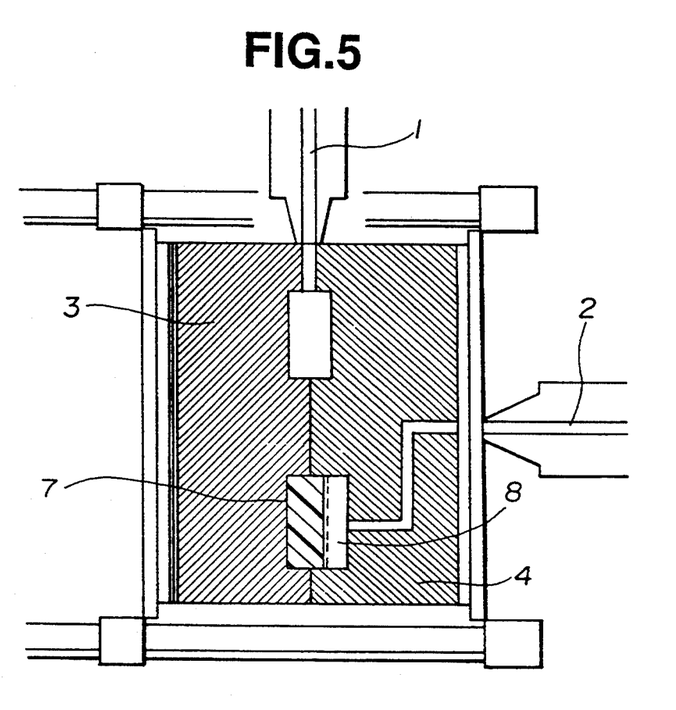
FIG. 5 is a schematic cross-sectional view similar to FIG. 2 at a stage when a silicone rubber composition is injection molded.

Then liquid addition type silicone rubber composition (I) was injected against the exposed surface of the resin sheet 7 through the nozzle 2 to mold a rubber sheet 8 as shown in FIG. 5. The molding conditions included an injection time of 6 seconds and a curing time of 100 seconds while the left and right mold halves 3 and 4 were at temperature of 60° C. and 80° C., respectively.

Figure 6:
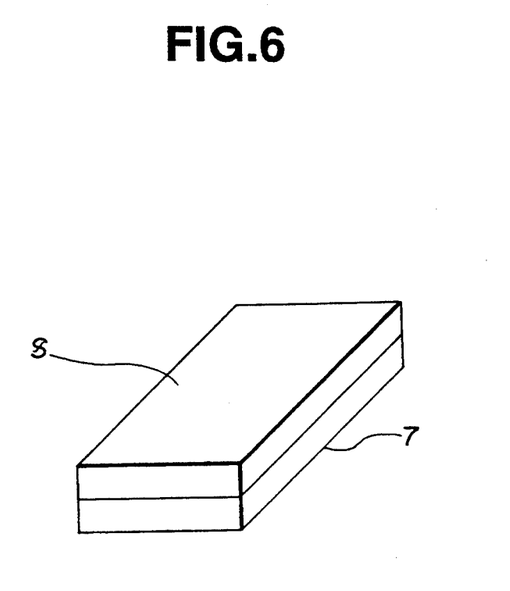
FIG. 6 is a perspective view of a molded article obtained from the stage of FIG. 5.

The foregoing procedure yielded a composite molded article as shown in FIG. 6 wherein the resin and rubber sheets 7 and 8 were firmly joined together. Both the sheets were of the same dimensions: 2.5 mm wide, 15 cm long, and 2 mm thick. The composite molded article was firmly integrated and had satisfactory dimensional precision and production yields.

Comparative Example 2

A composite molded article as shown in FIG. 6 was prepared by the same procedure as in Example 2 except that the modified polypropylene resin was replaced by an unmodified polypropylene. The article was examined for adhesion to find that the resin sheet was readily separated from the silicone rubber sheet.

Example 3

Preparation of Silicone Rubber Composition

To 100 parts of silicone rubber composition (I) in Example 1 was added 2 parts of a compound of formula (B) or (C) shown below as tackifier component (d). There were obtained silicone rubber compositions within the scope of the invention.

(B)

(C)

Preparation of Polypropylene (PP) Resin

Random copolymerization of propylene and 1,9-decadiene was effected at 70° C. in the presence of a propylene polymerizing catalyst based on a Ziegler-Natta catalyst activating titanium trichloride. The modified polypropylene resin had a 1,9-decadiene content of 1.5 mol % as measured by NMR and an MFR of 0.3 g/10 min.

The modified polypropylene resin was admitted into a thermoplastic resin injection molding machine where the resin was plasticized at 200° C. and injected into a plurality of sheet-shaped mold cavities whereby a plurality of sheets of 25 mm wide, 100 mm long, and 2 mm thick were molded. The injection molding conditions included an injection time of 6 seconds, a cooling time of 30 seconds, an injection pressure of 1,000 kg/cm$^2$, a clamping pressure of 35 ton, and a cavity temperature of 60° C.

To a jig for forming shear adhesion test pieces was fixedly attached the polypropylene resin sheet or each of chromium-plated metal, nickel-plated metal and aluminum alloy sheets of the same dimensions. A proper amount of the silicone composition was poured into the jig where it was cured by heating for 8 minutes in a 120° C. constant temperature oven, obtaining a test piece as shown in the side and plan views of FIGS. 1A and 1B.

The test pieces were examined by an adhesion test. The results are shown in Table 2.

Comparative Example 3

Adhesive test pieces as shown in FIGS. 1A and 1B were prepared by the same procedure as in Example 3 except that the modified polypropylene resin was replaced by an unmodified polypropylene. The test pieces were examined for adhesion. The results are also shown in Table 2.

TABLE 2

| Sheet | Test | Remarks |
|---|---|---|
| Modified PP | bonded | Example 3 |
| Chromium-plated metal | bonded | Example 3 |
| Nickel-plated metal | bonded | Example 3 |
| Aluminum alloy | bonded | Example 3 |
| Unmodified PP | separated | Comparative Example 3 |

Example 4

Several sheets of 25 mm wide, 100 mm long, and 2 mm thick were injection molded from the same polypropylene resin by the same method under the same conditions as in Example 3.

Separately, to 100 parts of composition (I) was added 0.5 or 1 part of a compound of formula (D) or (E) shown below as tackifier component (d). There were obtained silicone rubber compositions within the scope of the invention.

To a jig for forming shear adhesion test pieces was fixedly attached the polypropylene resin sheet or each of chromium-plated metal, nickel-plated metal and aluminum alloy sheets of the same dimensions. A proper amount of the silicone rubber composition was poured into the jig where it was cured by heating for 8 minutes in a 120° C. constant temperature oven, obtaining a test piece as shown in the side and plan views of FIGS. 1A and 1B. The test pieces were examined for adhesion. The results are shown in Table 3.

Comparative Example 4

A sheet of 25 mm wide, 100 mm long, and 2 mm thick was injection molded by the same procedure as in Example 4 except that the modified polypropylene resin (filler free) was replaced by an unmodified polypropylene (filler free). Liquid addition type silicone rubber composition (I) in Example 1 was cured to the sheet by heating for 8 minutes in a 120° C. constant temperature oven, obtaining a test piece as shown in FIGS. 1A and 1B. It was examined for adhesion. The result is also shown in Table 3.

TABLE 3

| | Example 4 | | | |
|---|---|---|---|---|
| Tackifier (D) | 0.5 pbw | 1 pbw | — | — |
| Tackifier (E) | — | — | 0.5 pbw | 1 pbw |
| Cr-placed metal | separated | separated | separated | separated |
| Ni-plated metal | separated | separated | separated | separated |
| Aluminum alloy | separated | separated | separated | separated |
| Modified PP | bonded | bonded | bonded | bonded |
| | Comparative Example 4 | | | |
| Unmodified PP | separated | separated | separated | separated |

Example 5

The same polypropylene resin modified with 1.5 mol % of diene as in Example 3 was admitted into the injection molding machine of FIG. 2 where it was melted at 200° C. and injected into the upper cavity 5 through the nozzle 1 to mold a polypropylene resin sheet 7 as shown in FIG. 3. The injection molding conditions included an injection time of 6 seconds and a cooling time of 35 seconds while the upper cavity 5 and left mold half 3 were maintained at a temperature of 60° C.

Next, the right mold half 4 was removed to open the mold. With the resin sheet 7 left in the recess of the left mold half 3, the mold half 3 was rotated 180° about a horizontal axis. The right mold half 4 was mated again with the left mold half 3 and clamped together. Then a cavity for molding a silicone rubber sheet was defined between the exposed surface of the resin sheet 7 and the lower recess of the right mold half 4 as shown in FIG. 4.

Then a composition containing 100 parts of liquid addition type silicone rubber composition (I) and 0.5 or 1 part of tackifier (D) or (E) used in Example 4 was injected against the exposed surface of the resin sheet 7 through the nozzle 2 to mold a rubber sheet 8 as shown in FIG. 5. The molding conditions included an injection time of 6 seconds and a curing time of 100 seconds while the left and right mold halves 3 and 4 were at temperatures of 60° C. and 80° C., respectively.

The foregoing procedure yielded a composite molded article as shown in FIG. 6 wherein the resin and rubber sheets 7 and 8 were firmly joined together. Both the sheets were of the same dimensions: 2.5 mm wide, 15 cm long, and 2 mm thick. All composite molded articles obtained from the compositions having 0.5 and 1 part of tackifiers (D) and (E) were firmly integrated and had satisfactory dimensional precision and production yields. The rubber sheets could be readily released from the mold made of chromium-plated carbon steel.

Comparative Example 5

A composite molded article as shown in FIG. 6 was prepared by the same procedure as in Example 5 except that the modified polypropylene resin was replaced by an unmodified polypropylene. The article was examined for adhesion to find that the resin sheet was readily separated from the silicone rubber sheet.

Although some preferred embodiments have been described, many modifications and variations may be made thereto in the light of the above teachings. It is therefore to be understood that within the scope of the appended claims, the invention may be practiced otherwise than as specifically described.

We claim:

1. A polypropylene resin/silicone rubber molded article comprising 1) a preform of a polypropylene resin having an aliphatic unsaturated bond or a composition comprising said polypropylene resin, and 2) an addition cured silicone rubber, wherein said preform is bonded to said silicone rubber, and said polypropylene resin is selected from the group consisting of a random copolymer of propylene and at least one non-conjugated diene compound selected from the group consisting of 2-methyl-1,4-pentadiene, 1,4-hexadiene, 4-methyl-1,4-hexadiene, 1,4-heptadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene and 1,13-tetradecadiene;

a graft copolymer of polypropylene and at least one non-conjugated diene compound of the following formula wherein $R_1$ to $R_4$ are independently a hydrogen atom or alkyl group having 1 to 6 carbon atoms, and m is an integer from 1 to 20; and a modified polypropylene that is obtained by 1) block copolymerizing a first monomer having an unsaturated bond and a first functional group with propylene or grafting said first monomer to polypropylene via radical polymerization, and 2) reacting the resultant block copolymer or graft copolymer with a second compound having an unsaturated bond and a second functional group that is capable of reacting with said first functional group.

2. The polypropylene resin/silicone rubber molded article according to claim 1, wherein said first and second monomers are selected from the group consisting of unsaturated amide, unsaturated amine, unsaturated epoxy compound, unsaturated carboxylic acid, vinyl oxazoline and unsaturated compounds having a hydroxyl group.

3. The polypropylene resin/silicone rubber molded article according to claim 1, wherein said addition cured silicone rubber is obtained by curing a silicone rubber composition comprising a) an alkenyl group-containing organopolysiloxane, b) an organohydrogensiloxane having at least two hydrogen atoms directly attached to a silicon atom in a molecule and c) an addition reaction catalyst.

4. The polypropylene resin/silicone rubber molded article according to claim 3, wherein said alkenyl group-containing organopolysiloxane is represented by the formula wherein R is a halo or cyano substituted or unsubstituted monovalent hydrocarbon group having 1 to 8 carbon atoms, and a is a number from 1.9 to 2.4, and the content of said alkenyl group in said organopolysiloxane is from 0.01 to 10 mol % of the entire R groups.

5. The polypropylene resin/silicone rubber molded article according to claim 3, wherein the content of said organohydrogen-polysiloxane in said silicone rubber composition is 0.4 to 5 equivalents per alkenyl group in said organopolysiloxane.

6. The polypropylene resin/silicone rubber molded article according to claim 3, wherein said addition reaction catalyst is platinum or a platinum compound.

7. A polypropylene resin/silicone rubber molded article comprising 1) a preform of a polypropylene resin having an aliphatic unsaturated bond or a composition comprising said polypropylene resin, and 2) an addition cured silicone rubber comprising a component (I) or (II), said component (I) being a compound containing in a molecule at least one hydrogen atom directly attached to a silicon atom and at least one member selected from the group consisting of an alkoxysilyl group, glycidyl group and acid anhydride group, and said component (II) being a compound containing in a molecule at least one hydrogen atom directly attached to a silicon atom and a divalent linkage —$(CR^1R^2)_n$— wherein each of $R^1$ and $R^2$ is a hydrogen atom or a monovalent hydrocarbon group having 1 to 10 carbon atoms and letter n is an integer of from 2 to 30, wherein said preform is bonded to said silicone rubber, and said polypropylene resin is selected from the group consisting of a random copolymer of propylene and at least one non-conjugated diene compound of the following formula wherein $R_1$ to $R_4$ are independently a hydrogen atom or alkyl group having 1 to 6 carbon atoms, and $R_1$ and $R_2$ are not both methyl groups when $R_3$ is a hydrogen atom, and n is an integer from 1 to 20;

a graft copolymer of polypropylene and at least one non-conjugated diene compound selected from the group consisting of 2-methyl-1,4-pentadiene, 1,4-hexadiene, 4-methyl-1,4-hexadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene and 1,13-tetradecadiene; and a modified polypropylene that is obtained by 1) block copolymerizing a first monomer having an unsaturated bond and a first functional group with propylene or grafting said first monomer to polypropyl- ene via radical polymerization, and 2) reacting the resultant block copolymer or graft copolymer with a second compound having an unsaturated bond and a second functional group that is capable of reacting with said first functional group.

8. The polypropylene resin/silicone rubber molded article according to claim 7, wherein said component (I) is selected from the group consisting of

9. The polypropylene resin/silicone rubber molded article according to claim 7, wherein said component (II) is selected from the group consisting of n = 2 to 30, and 10. The polypropylene resin/silicone rubber molded article according to claim 7, wherein the content of said component (I) or (II) in said addition cured silicone rubber is from 0.05 to 10 parts by weight per 100 parts by weight of component (a).

11. A polypropylene resin/silicone rubber molded article comprising 1) a preform of a polypropylene resin having an aliphatic unsaturated bond or a composition comprising said polypropylene resin, and 2) an addition cured silicone rubber comprising a component (I) or (II), said component (I) being a compound containing in a molecule at least one hydrogen atom directly attached to a silicon atom and at least one member selected from the group consisting of an alkoxysilyl group, glycidyl group and acid anhydride group, and said component (II) being a compound containing in a molecule at least one hydrogen atom directly attached to a silicon atom and a divalent linkage —$(CR^1R^2)_n$— wherein each of $R^1$ and $R^2$ is a hydrogen atom or a monovalent hydrocarbon group having 1 to 10 carbon atoms and letter n is an integer of from 2 to 30, wherein said preform is bonded to said silicone rubber, and said polypropylene resin is selected from the group consisting of a random copolymer of propylene and at least one non-conjugated diene compound selected from the group consisting of 2-methyl-1,4-pentadiene, 1,4-hexadiene, 4-methyl-1,4-hexadiene, 1,4-heptadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene and 1,13-tetradecadiene;

a graft copolymer of polypropylene and at least one non-conjugated diene compound of the following formula wherein $R_1$ to $R_4$ are independently a hydrogen atom or alkyl group having 1 to 6 carbon atoms, and m is an integer from 1 to 20; and a modified polypropylene that is obtained by 1) block copolymerizing a first monomer having an unsaturated bond and a first functional group with propylene or grafting said first monomer to polypropylene via radical polymerization, and 2) reacting the resultant block copolymer or graft copolymer with a second compound having an unsaturated bond and a second functional group that is capable of reacting with said first functional group.

12. The polypropylene resin/silicone rubber molded article according to claim 11, wherein said random copolymer has 0.01 to 20 mol % of said non-conjugated diene based on said copolymer.

13. A polypropylene resin/silicone rubber molded article comprising 1) a preform of a polypropylene resin having an aliphatic unsaturated bond or a composition comprising said polypropylene resin, and 2) an addition cured silicone rubber, wherein said preform is bonded to said silicone rubber, and said polypropylene resin is selected from the group consisting of a random copolymer of propylene and at least one non-conjugated diene compound of the following formula wherein $R_1$ to $R_4$ are independently a hydrogen atom or alkyl group having 1 to 6 carbon atoms, and $R_1$ and $R_2$ are not both methyl groups when $R_3$ is a hydrogen atom, and n is an integer from 1 to 20;

a graft copolymer of polypropylene and at least one non-conjugated diene compound selected from the group consisting of 2-methyl-1,4-pentadiene, 1,4-hexadiene, 4-methyl-1,4-hexadiene, 4-methyl-1,4-heptadiene, 4-ethyl-1,4-heptadiene, 1,5-heptadiene, 1,5-octadiene, 5-methyl-1,5-heptadiene, 2-methyl-1,5-hexadiene, 1,6-octadiene, 6-methyl-1,6-octadiene, 2-methyl-1,6-heptadiene, 1,9-decadiene and 1,13-tetradecadiene; and a modified polypropylene that is obtained by 1) block copolymerizing a first monomer having an unsaturated bond and a first functional group with propylene or grafting said first monomer to polypropylene via radical polymerization, and 2) reacting the resultant block copolymer or graft copolymer with a second compound having an unsaturated bond and a second functional group that is capable of reacting with said first functional group.

14. The polypropylene resin/silicone rubber molded article according to claim 13, wherein said graft copolymer has 0.01 to 20 mol % of said non-conjugated diene compound based on said copolymer.

* * * * *